United States Patent [19]

Kamide et al.

[11] 4,370,168

[45] Jan. 25, 1983

[54] MESOPHASE DOPE CONTAINING CELLULOSE DERIVATIVE AND INORGANIC ACID

[75] Inventors: Kenji Kamide, Ikoma; Kunihiko Okajima; Toshihiko Matsui, both of Takatsuki, all of Japan

[73] Assignee: Asahi Kasei Kogyo Kabushiki Kaisha, Japan

[21] Appl. No.: 188,854

[22] Filed: Sep. 19, 1980

[30] Foreign Application Priority Data

Sep. 21, 1979 [JP] Japan .................................. 54/120718
Sep. 25, 1979 [JP] Japan .................................. 54/121960

[51] Int. Cl.³ .............................................. C08L 1/26
[52] U.S. Cl. .................................. 106/177; 106/197 R; 106/197 C
[58] Field of Search ............ 428/1; 106/177, 169–176, 106/193, 197, 196; 536/58, 64, 89; 264/176 F, 187

[56] References Cited

U.S. PATENT DOCUMENTS 1,521,876  1/1925  Farrow ................................. 106/196
1,943,461  1/1934  Traill et al. ........................... 536/89
2,095,334  10/1937  Jones ................................... 106/196

FOREIGN PATENT DOCUMENTS 2705382  8/1977  Fed. Rep. of Germany .

*Primary Examiner*—Theodore Morris
*Attorney, Agent, or Firm*—Finnegan, Henderson, Farabow, Garrett & Dunner

[57] ABSTRACT

A mesophase dope useful for producing shaped articles, for example, filaments and films, comprises at least 10% by weight of at least one cellulose derivative and the balance consisting of an aqueous solution of at least 5% by weight of at least one inorganic acid, the dope exhibiting the mesophase property even in the case where no fluid dynamic stress is applied thereto.

10 Claims, 4 Drawing Figures

MESOPHASE DOPE CONTAINING CELLULOSE DERIVATIVE AND INORGANIC ACID

FIELD OF THE INVENTION

The present invention relates to a mesophase dope. More particularly, the present invention relates to a mesophase dope comprising a cellulose derivative material dissolved in an aqueous solution of an inorganic acid material, the viscosity of which dope is capable of being adjusted to a value suitable for forming the dope into filaments or a film while maintaining the mesophase property of the dope.

BACKGROUND OF THE INVENTION

The term "mesophase dope" used herein is defined by F. C. Frank, Discussin Faraday Society, 25, 19(1958), as follows. That is, the term "mesophase dope" refers to a dope, which exhibits such a property that the movement of the centers of gravity of the molecules, from which the dope is formed, is carried out fluidly, and the change in orientation of the molecules is carried out elastically. The mesophase dope of the present invention should be distinguished from a dope having such a property that, when the dope is placed in a fluid dynamic field, for example, when a fluid dynamic force is applied to the dope so as to create a velocity gradient of the dope and, therefore, to produce a shearing force on the dope, a fluid birefringence is created in the dope. In other words, the mesophase dope of the present invention is a dope exhibiting a bright interference color visible to the naked eye due to a certain type of systematic arangement or orientation of the molecules from which the dope is formed, even in the core where no stimulation is applied from the outside to the dope. In still other words, the mesophase dope of the present invention is a dope exhibiting liquid and solid properties that the dope exhibits a bright field of view under an orthogonal Nicol's prism of a polarizing microscope. In this regard, the term "mesophase dope" has the same meaning as the terms "liquid crystal", "optical anisotropic liquid" and "ordered liquid". In the present invention, the mesophase dope is a liquid crystal created by an interaction between a polymer and a certain solvent. Therefore, when the mesophase dope of the present invention is subjected to a wet spinning process, the resultant filaments have a high degree of orientation of the polymer molecules therein without applying a drawing procedure as in the case of ordinary spun filaments.

It is known that solutions or melts of various polymers having rigid molecular chains, for example, synthetic polypeptides, aromatic polyamides, aromatic polyamide-hydrazides, aromatic polyazomethines and aromatic polyesters, form mesophase dopes. Flory (Proceedings of the Royal Society, Series A 234,73(1956)) conducted research on a statistical treatment of rigid polymer dope and provided a general explasion of the free energy in mixing of rigid polymers, as a function of the mole number of the rigid polymer, axial ratio and disorientation coefficient of solute molecule. Also, Flory predicted a separation of an optical anisotropic phase from isotropic phase of the rigid polymer at a critical concentration of the rigid polymer dope. The phase separation is derived from asymmetry of the particles in the dope. That is, in the dope of the rigid polymer, the concentration of the anisotropic phase remarkably increased due to the relatively small positive interaction energy.

In a dope of a semi-flexible polymer the molecules of which have a certain flexibility, the mesophase property of the dope depends mainly upon the length of a rigid segment in the semi-flexible molecule.

Accordingly, it is practically and theoretically supported that a specific solution of a rigid polymer or semi-flexible polymer can form a mesophase dope.

Since Flory et al studied the polymer dopes, various discussions have been made on the flexibility of molecular chains of various cellulose derivatives. However, the discussions were not correct, because the draining effect of solvent was not properly considered in the discussions.

Recently, Kamide et al. (Polymer Journal, 10, 4,409(1978)) carefully analyzed data concerning the properties of solutions of various cellulose derivatives and reached a conclusion concerning the flexibility of the molecular chains in the cellulose derivatives. Concerning the conclusion, it should be noted that the expanse of the molecular chain of the cellulose derivative, and the rigidity of the molecular chain in an unperturbation state are remarkably variable depending on the type of solvent used, and the rigidity of the molecular chain of the cellulose derivative is definitely higher than that of vinyl polymers. The above-mentioned properties of the cellulose derivative are derived from the polar hydroxy (—OH) groups in its molecule and the heterooxygen atom located between molecules, and therefore, are variable depending upon the degree of substitution of the cellulose molecule.

Japanese Patent Application Laid-open (kokai) No. 52-96230 discloses the fact that an optical anisotropic dope is obtained from a combination of a cellulose derivative having a degree of substitution of 1.0 or more with a specific solvent. From the teaching of the cellulose chemistry, it is known that an increase in the degree of substitution of hydrogen atoms in the hydroxy groups in cellulose molecules by substituents, especially, hydrophobic substituents, for example, alkyl or ester groups, causes the solubility of the resultant cellulose derivative in an organic solvent to be increased. However, generally, it is difficult to obtain a uniform solution by dissolving the cellulose derivative in an organic solvent, because of formation of partial gel in the solution. In the case of a mesophase dope in which a cellulose derivative has to be dissolved in a very high concentration of 15% by weight or more in the organic solvent, the formation of the partial gel is promoted. Therefore, in this case, it is very difficult to obtain a uniform structure of mesophase dope of the cellulose derivative. Also, the non-uniform dope can not be convented into a shaped article having a uniform quality. Furthermore, it is very difficult to completely eliminate the organic solvent from the resultant shaped article. This last difficulty causes a problem in the quality of the resultant shaped article.

The above-mentioned Japanese laid-open specification disclose several inorganic solvents for forming the mesophase dope of the cellulose derivative, however, the aqueous solution of inorganic solvent is not described as a solvent for the mesophase dope in the early publication. For example, combinations of hydroxypropylcellulose (HPC) with water, a sodium salt of carboxymethylcellulose (CMC-Na) with water, CMC-Na with an aqueous solution of sodium hydroxide, CMC-Na with an aqueous solution of sodium chloride and a sodium salt of cellulose sulfate with water, are described in the laid-open specification. However, in order to form the mesophase dopes from the above-mentioned combinations, it is necessary that the almost all of the cellulose derivatives be used in a high concentration of 50% by dry weight or more. Such high concentration of the mesophase dope is not suitable for producing shaped articles therefrom. Even in the case where a mesophase dope can be produced from about 30% by dry weight of the cellulose derivative and the inorganic solvent, the resultant mesophase dope is in the state of a paste and exhibits a poor filament-forming property. Also, the use of the above-mentioned salt solution or alkali solution causes such a problem that metal element from the inorganic solvent is retained in the resultant shaped material or that the waste water from the shaping process has to be clarified so as to avoid public polution of rivers, the sea or lakes.

On the other hand, various inorganic acids which are not described as a solvent for the cellulose derivative in above-mentioned Japanese laid-open specification, are utilized for depolymerizing cellulose materials so as to produce pulp having a desired degree of polymerization. However, due to their high depolymerizing effect, the inorganic acids have not been used as a solvent for the cellulose derivative. For example, in the preparation of cellulose acetate or cellulose nitrate, it has often been experienced in the cellulose industry that the cellulose material is remarkably depolymerized by inorganic acid, such as sulfuric acid, and the resultant product contains a certain amount of the $SO_4^{2-}$ ion, which results in undesirable formation of gels in the solution of the cellulose derivative. From the above-mentioned experience, the use of the inorganic acid has been avoided by the cellulose industry.

Also, E. Otto and Spurline's edited Cellulose, Parts I to III, and Cellulose and Cellulose derivatives, Parts IV and V, Inter Science, in which cellulose chemistry is described in detail, contains substantially no description concerning the solubility of the cellulose derivatives in the inorganic acids, whereas the solubility of the cellulose derivatives in water or various alkali solutions or organic solvents is described very much in detail therein.

The inventors of the present invention conducted detailed studies regarding the expanse and, in its turn, the rigidity of the molecular chains of the cellulose derivatives in various solvents, in accordance with the theorem that the expanse of the molecular chains of a polar polymer in unperturbation state is promoted in a polar solvent. Also, while considering the disadvantages of the organic solvents and inorganic salt aqueous solution used as a solvent for the cellulose derivatives, the inventors of the present invention studied the production of a mesophase dope from cellulose or cellulose derivatives, for example, cellulose ethers or cellulose esters, and a specific solvent. As a result of these studies, the inventors of the present invention surprisingly discovered that a mesophase dope can be prepared from a cellulose derivative material dissolved in a solvent consisting of an aqueous solution of an inorganic acid, and the resultant dope is extremely stable in a wide range of concentration of the cellulose derivative material and in a wide range of the concentration of the inorganic acid in the dope.

SUMMARY OF THE INVENTION

An object of the present invention is to provide a mesophase dope containing a cellulose derivative and an inorganic acid, which dope is capable of exhibiting a stable mesophase property even in the case where no fluid dynamic stress is applied thereto.

Another object of the present invention is to provide a mesophase dope containing a cellulose derivative and an inorganic acid, which dope is useful for producing new type of filaments and/or films having a new type of structure and excellent mechanical properties.

The above-mentioned objects can be attained by the mesophase dope of the present invention which comprises at least 10% by weight of at least one cellulose derivative contained in an aqueous solution of at least 5% by weights of at least one inorganic acid, said dope exhibiting a mesophase property even in the case where no fluid dynamic stress is applied thereto.

DETAILED DESCRIPTION OF THE INVENTION

Figure 1:
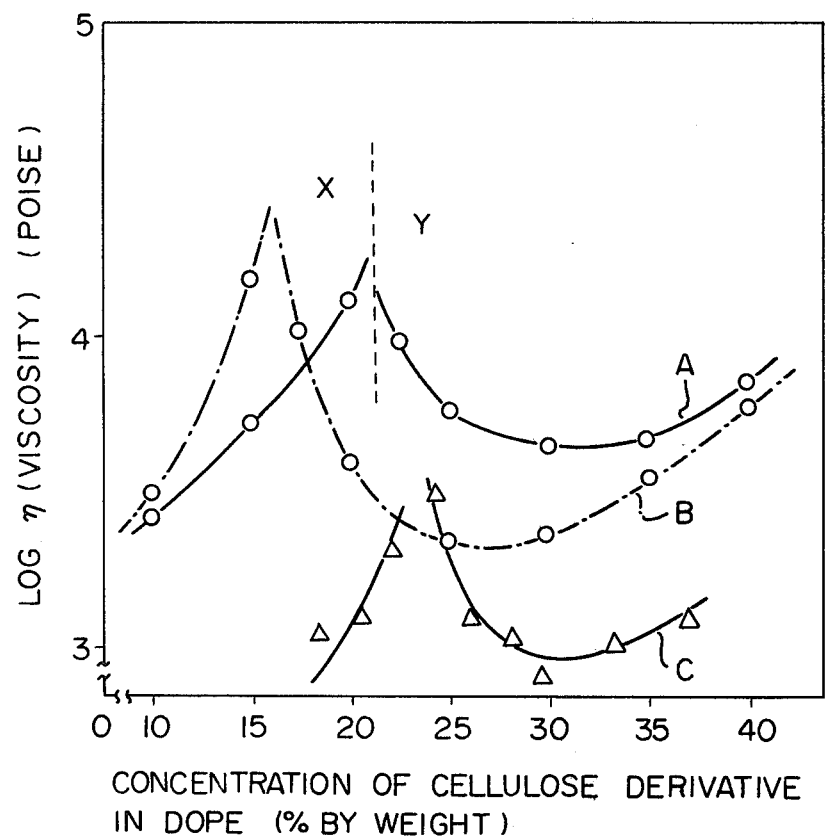
FIG. 1 is a graph showing relationships between the viscosities of mesophase dopes containing (A) a cyanoethylcellulose (CyEC) having a degree of polymerization (DP) of 320 and a degree of substitution (DS) of 2.6, and a 73.5% nitric acid aqueous solution; (B) a methylcellulose (MC) having a DP of 750 and a DS of 1.8, and an 83% phosphoric acid aqueous solution, and; (C) a cellulose acetate (CA) having a DP of 250 and a DS of 2.57, and a 65% nitric acid aqueous solution; and concentrations of (A) (B) MC and (C) CA, respectively.

In the mesophase dope of the present invention, the cellulose derivative is preferably selected from the group consisting of cellulose ethers and cellulose esters. This is because: the cellulose ethers and esters having a wide range of degree of substitution are soluble in the aqueous solutions of the inorganic acids; the preparation of the cellulose ethers and esters is easy; the degree of substitution and/or the degree of polymerization of the cellulose ethers and esters can be adjusted to desired values in a strong acid solution, and; it is possible to produce various shaped articles which exhibit different properties than those of the starting cellulose ethers or esters.

The cellulose ether usable for the present invention may be selected from the group consisting of methylcellulose (MC), ethylcellulose (EC), cyanoethylcellulose (CyEC), carbamoylethylcellulose (CmEC), carboxyethylcellulose (CEC), cyanoethylcarbamoylethylcellulose (CyEC-CmEC), cyanoethylcarboxyethylcellulose (CyEC-CEC), carboxyethylcarbamoylethylcellulose (CEC-CmEC), hydroxyethylcellulose (HEC), ethylhydroxyethylcellulose (EHEC), hydroxypropylcellulose (HPC), hydroxypropylmethylcellulose (HPMC) carboxymethylcellulose (CMC), acetoxymethylcellulose (AMC) and acetoxymethylcellulose acetate (AMCA), and possible salts, for example, possible sodium salts, of the above-mentioned cellulose ether compounds.

The cellulose ester usable for the present invention is preferably cellulose acetate.

The above-mentioned cellulose ethers and esters can be dissolved, in the state of a molecular dispersion, in the aqueous solution of the inorganic acid.

Each of or a mixture of two or more of MC, CyEC, CEC, CyEC-CEC, CyEC-CmEC, CEC-CmEC, AMC, AMCA and CA is preferably used as a cellulose derivative for the present invention.

The high solubility of the cellulose derivative in the aqueous solution of the inorganic acid is important for the formation of a mesophase dope.

This is because, it is necessary that the cellulose derivative be dissolved in a concentration of at least 10% by weight in the inorganic acid aqueous solution.

Generally, in a specific type of cellulose derivatives having a specific degree of substitution, an increase in degree of polymerization (DP) causes a concentration of the cellulose derivative necessary for forming a mesophase dope in a specific inorganic acid aqueous solution to decrease. Usually, the degree of polymerization of the cellulose derivative usable for the present invention is not limited to a special value. However, when the mesophase dope is used for the production of shaped articles, it is preferable that the degree of polymerization of the cellulose derivative be 100 or more.

In the mesophase dope of the present invention, since the solvent consists of the aqueous solution of the inorganic acid, it is possible to produce a stable mesophase dope even in the case where the degree of substitution (DS) of the cellulose derivative is small, for example, less than 1.0 (DS < 1). This feature of the mesophase dope of the present invention cannot be found in the conventional mesophase dopes, as described in the above-mentioned Japanese Patent Application Early Publication No. 53-96230 (1978).

The solubility of the cellulose derivative in the inorganic acid aqueous solution is variable depending upon the type of substituent and the degree of substitution of the cellulose derivative. For example, CyEC and CEC can form a mesophase dope in the inorganic acid aqueous solution in the entire range of the degree of substitution, that is, satisfying the relation: $0 < DS \leq 3.0$, HPC and HEC exhibit the same mesophase dope-forming property as that of CyEC and CEC. However, in the cases of EC and MC, the degree of substitution of more that 2.3 results in a decreased solubility thereof in the inorganic acid aqueous solution. Therefore, it is preferable that EC and MC have a degree of substitution of 2.3 or less. Also, in the cases of CA, AMCA and AMC, the degree of substitution thereof preferably satisfies the relation: $0 < DS \leq 2.7$.

The inorganic acid usable for the mesophase dope of the present invention may be selected from the group consisting of hydrochloric acid, nitric acid, sulfuric acid, phosphoric acid, metaphosphoric acid, pyrophosphoric acid, hypophosphoric acid, sulfurous acid, fluorosulfuric acid, chlorosulfuric acid, chloric acid, hypochloric acid, chlorous acid, perchloric acid, bromic acid, perbromic acid, hypobromous acid, hydrofluoric acid, thiocyanic acid and thiosulfuric acid.

The above-mentioned inorganic acids may be used alone or in a mixture of two or more thereof. In practical use, at least one inorganic acid is dissolved in a concentration of at least 5% by weight in water. The concentration of the inorganic acid in the aqueous solution is variable depending upon the types of the inorganic acid per se and the cellulose derivative to be dissolved. For example, in the case of MC having a DS of 2.3 or less, it is preferable that 12 to 35% by weight of MC be dissolved in an aqueous solution of phosphoric acid in a concentration of 30% by weight or more, or nitric acid in a concentration of 50% by weight or more. In the case of CyEC having a DS of more than zero but not exceeding 3.0, it is preferable that 20 to 45% by weight of CyEC be dissolved in an aqueous solution of nitric acid in a concentration of 50% by weight or more. Also, in the case of CA having a DS of 2.7 or less, it is preferable that 20 to 38% by weight of CA be dissolved in an aqueous solution of nitric acid or sulfuric acid in a concentration of 22% by weight or more. Furthermore, in the case of CA having a DS of 0.35, it is preferable to use an aqueous solution of nitric acid in a concentration of from 5 to 75% by weight.

If it is desired to control the hydrolysis of the cellulose derivative or to prevent the decomposition of the cellulose derivative in the inorganic acid aqueous solution, the inorganic acid may be heat pretreated or the atmosphere in which the mesophase dope is prepared, may consist of nitrogen gas.

Generally speaking, in a combination of a specific cellulose derivative with a specific inorganic acid, a decrease in the concentration of the inorganic acid in the aqueous solution results in a increase in the concentration of the cellulose derivative necessary for forming a mesophase dope.

The minimum concentration of a specific inorganic acid necessary for forming a mesophase dope of a specific cellulose derivative is variable depending upon the types of the inorganic acid and the cellulose derivative used. For example, in the case of MC having a DS of 1.8 and a DP of 140, the minimum concentrations of hydrochloric acid and nitric acid necessary for forming a mesophase dope are 20% and 5% by weight, respectively.

Generally, in the mixture of an inorganic acid with water, the state of the inorganic acid per se is variable in response to the composition of the mixture. That is, the inorganic acid in the aqueous solution is not always dissociated by water into a limiting state. This feature of the inorganic acid aqueous solution is different from that of mixtures of a conventional organic acid with water. Also, this feature is an important factor for forming a mesophase dope of the cellulose derivative.

In the mesophase dope of the present invention, since the aqueous solution of the inorganic acid is used as a solvent for the cellulose derivative, it is possible to alter the viscosity of the dope to a desired value without changing the mesophase property of the dope. For example, in a mesophase dope of methylcellulose (MC) having a degree of polymerization (DP) of 650 and a degree of substitution (DS) of 1.8, and dissolved in an 85% sulfuric acid aqueous solution, a decrease in the viscosity of the dope to a value corresponding to $\frac{2}{3}$ of the original viscosity thereof, does not cause any change in the mesophase property of the dope usually, the hight viscosity of the mesophase dope causes defoaming, extruding and spreading procedures for the dope to be difficult, and a large amount of energy to be consumed for carrying out the above-mentioned procedures. The above-mentioned disadvantages due to the high viscosity can be prevented by reducing the viscosity of the dope without changing the mesophase property of the dope.

For example, a fresh mesophase dope produced from 40% by weight of methylcellulose and an 85% phosphoric acid aqueous solution exhibited a very high viscosity of about 3500 poises at a temperature of 25° C. Therefore one day or more was necessary for completely defoaming the fresh dope at a temperature of 0° C. Also, it was difficult to spread the fresh dope to form a film. However, when the viscosity of the dope was reduced to 2200 poises at a temperature of 0° C. the heat-treated dope was easily spread to form a film.

In another example, even in the case where the viscosity of a mesophase dope containing 40% by weight of a cellulose acetate having a DP of 300 and a DS of 2.45, and a 65% nitric acid aqueous solution, is reduced to a value corresponding to ½ of the original viscosity of the dope, by heat-treating it, at a temperature of 45° C., for 30 minutes, the heat-treated dope exhibited the same mesophase property as that of the non-treated dope.

Also, it is possible to alter the degree of substitution of the cellulose derivative in the mesophase dope of the present invention by heat-treating the dope. The alteration in the degree of substitution causes the solubility of the cellulose derivative to be changed. For example, a mesophase dope containing an acetone-soluble cellulose acetate and a 65% nitric acid aqueous solution can be converted into another mesophase dope which is resistant to organic solvents and which can be used for producing a shaped article having a different structure from that produced from the non-converted dope.

The mesophase property of the dope can be determined by various methods. Almost all of the mesophase dopes of the present invention exhibit an interference color or a pearl color. Therefore, it is easy to recognize the mesophase property of the dope of the present invention with the naked eye. Otherwise, the mesophase property of the dope of the present invention can be recognized from the fact that a bright field of view is found by observing dope placed between a glass plate and a cover glass plate, through an orthogonal Nicol's prism of a polarized microscope, even in the case where no shearing force is applied to the dope.

A range of the concentration of the cellulose derivative in which the dope can exhibit a mesophase property, can be determined from a relationship between the viscosity of the dope and the concentration of the cellulose derivative in the dope. Generally, in an isotropic dope of a cellulose derivative, the molecular chains of the cellulose derivative are entangled with each other. The viscosity of the isotropic dope increases with the increase in the concentration of the cellulose derivative in the dope. However, in the specific range of the concentration of the cellulose derivative in which the dope exhibits a mesophase property, the molecular chains of the cellulose derivatives are orientated in a specific arrangement, and therefore, the degree of entanglement of the molecular chain decreases. This phenomenon causes the viscosity of the dope to significantly decrease.

FIG. 1 shows relationships between the viscosities of dopes containing: (A) a cyanoethylcelulose (CyEC) having a degree of polymerization (DP) of 320 and a degree of substitution (DS) of 2.6, and a 73.5% nitric acid aqueous solution; (B) a methylcellulose (MC) having a DP of 750 and a DS of 1.8, and an 83% phosphoric acid aqueous solution, and; (C) a cellulose acetate (CA) having a DP of 250 and a DS of 2.57, and a 65% nitric acid aqueous solution; and the concentrations of CyEC in the dope (A) MC in the dope (B) and CA in the dope (C), respectively. The viscosities of the dopes were determined at a shearing velocity of 20 sec.$^{-1}$, at temperature of 5° C., by using a cone plate-type rotation viscometer. In FIG. 1, the dope (A) exhibits an isotropic property in region X and an anisotropic property in region Y. FIG. 1 shows that in each of the dopes (A), (B) and (C), the viscosity of the dope remarkably decreases in a range of the concentration of the cellulose derivative in which the mesophase phase is separated from the dope, and then, the viscosity increases in a range of the concentration of the cellulose derivative in which the separation of the mesophase phase is completed.

Figure 2:
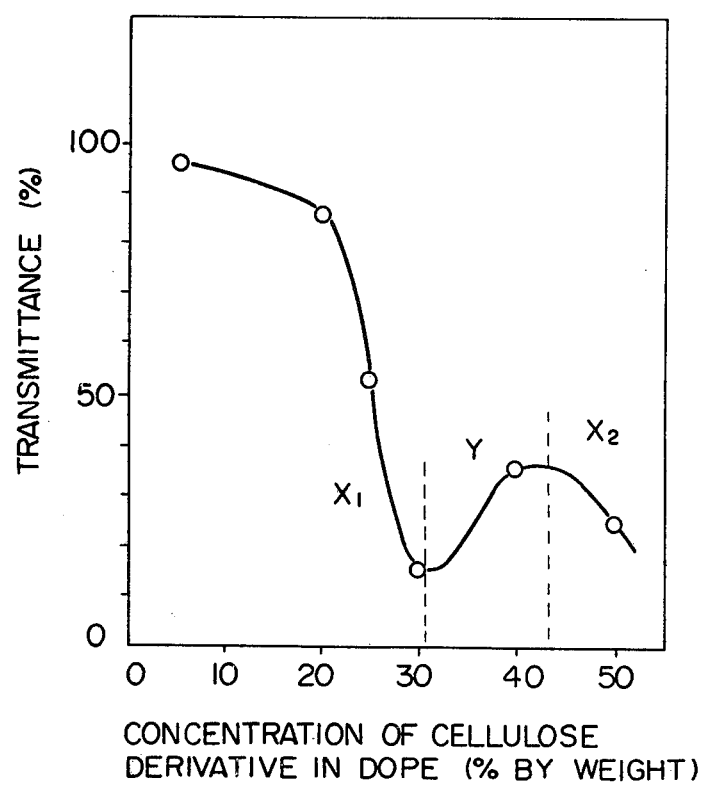
FIG. 2 is a graph showing a relationship between a percent of visible ray transmittance of a mesophase dope containing a carboxyethylcellulose (CEC) and nitric acid, and the concentration of CEC in the dope.

FIG. 2 shows a relationship between a percent of transmittance of visible rays through a dope containing a carboxyethylcellulose (CEC) having a DP of 290 and a DS of 2.2, and a 60% nitric acid aqueous solution, and a concentration of CEC in the dope. The percent of transmittance of the visible rays was determined by using a light having a wave length of 720 mm at a temperature of 25° C. In FIG. 2, the dope exhibits an isotropic property in regions $X_1$ and $X_2$, and an anisotropic property in a region Y.

Based on FIG. 2, it is considered that, since there is a relationship between the percent of transmittance of the visible rays for the dope and the birefringence coefficient of the dope, and the birefringence coefficient of the dope depends upon the arrangement of the molecular chains of the cellulose derivative in the dope, the percent of transmittance of the dope becomes maximum in a specific range of the concentration of the cellulose material in the dope in which the dope exhibits a mesophase property, due to the specific orientation of the molecular chains of the cellulose derivatives therein. The theoretical reason for the above-mentioned phenomenon has not yet been clarified.

The mesophase dope of the present invention does exhibit a stable mesophase property without applying a fluid dynamic stress thereto. For example, dopes of cyanoethylcellulose in a nitric acid aqueous solution, methylcellulose in a phosphoric acid aqueous solution, carboxyethylcellulose in a nitric acid aqueous solution, methylcellulose in a nitric acid aqueous solution and cyanoethylcellulose in a phosphoric acid aqueous solution, can exhibit the mesophase property over a period of from several days to several weeks from the preparation thereof, at a temperature of from 0° C. to room temperature. Compared with the above-mentioned dopes of the present invention, almost all of the conventional dopes containing, for example, a cellulose ether in an organic solvent, and the aqueous dopes as described in Japanese Patent Application Laid-open (Kokai) No. 55-96230, except for the dopes of ethylcellulose in a methyl alcohol-methylchloride type solvent, exhibit a mesophase property which is relaxed within several minutes or several seconds from the preparation thereof. Also, almost all of the above-mentioned conventional cellulose ether dopes must be stimulated by a fluid dynamic stress in order to exhibit the mesophase property. Accordingly, the mesophase dopes of the present invention can be definitely distinguished from the conventional mesophase dopes.

The mesophase dope of the present invention can be prepared by mixing a specific cellulose derivative with an inorganic acid aqueous solution and, then, by stirring the mixture at room temperature, or while cooling or heating it.

In the preparation of the mesophase dope of the present invention, the possibility of formation of undesirable gel is extremely low. Therefore, the mesophase dope useful for producing various shaped articles can be easily obtained within a short time. For example, in the case of preparation of a mesophase dope from cyanoethylcellulose and a 65% nitric acid aqueous solution, the preparation can be completed within 3 to 5 hours without formation of gel. However, in the case where dimethyl formamide is used as a solvent for the cyanoethylcellulose, in place of the 65% nitric acid aqueous solution, a large amount of gel is produced in the mixture, and therefore, it is extremely difficult to obtain a mesophase dope useful for the production of shaped articles. Generally, if the mesophase dope containing a high concentration of the cellulose derivative and, therefore, having a high viscosity, contains the gel, it is very difficult to remove the gel from the dope by means of filtration. However, the mesophase dope of the present invention contains substantially no gel. Therefore, the mesophase dope of the present invention can be subjected to the production of shaped articles, without the filtration procedure. This feature of the present invention is very advantageous in industry.

In the mesophase dope of the present invention, it is possible to depolymerize the cellulose derivative at a proper temperature to convert it to a modified mesophase dope having a desired viscosity. In this case, generally, the modified mesophase dope is further converted into a uniform dope having no mesophase property by elevating the temperature of the dope. However, by lowering the temperature of the uniform dope, the mesophase dope is reversibly reproduced from the uniform dope.

The mesophase dope of the present invention is advantageous in the following matters.

1. The solvent consisting of an inorganic acid aqueous solution is cheap. Therefore, the cost of the production of the mesophase dope is low.

2. By hydrolyzing the cellulose derivative in the dope, the viscosity of the dope can be adjusted to a desired value while the mesophase property of the dope is maintained. The mesophase dope having a desired viscosity is advantageously utilized for the production of various shaped articles.

3. The relaxation time of the mesophase dope is very long so that as long as the dope is stored at a proper temperature, the mesophase property can usually be stably maintained for from several days to several weeks.

4. Various types of mesophase dopes can be produced from various types of cellulose derivatives having a wide range of degree of substitution. Therefore, various new types of shaped articles having various different properties can be obtained from the mesophase dopes.

5. Basically, the mesophase dope can be produced by using a single solvent. Therefore, the preparation procedure of the mesophase dope is very easy and the solvent can be easily recovered.

6. When the mesophase dope is converted into a shaped article, for example, a filament or film, the amount of the solvent retained in the shaped article is much smaller than that when an organic solvent is used. Therefore, the purity and whiteness of the resultant shaped article are better than those when the organic solvent is used.

The mesophase dope of the present invention can be used for the production of a film or filaments having a new structure. In the case of the production of a filament yarn consisting of a cellulose derivative and having an excellent mechanical strength from the mesophase dope, it is preferable that an air-jet-wet spinning process be used. In the process, the filaments extruded through a spinneret located in an air atmosphere, are introduced vertically into a coagulation bath. After moving vertically, the coagulated filaments further move along pins located in the coagulation bath. The coagulated filaments are removed from the coagulation bath and, finally, wound on a bobbin.

The coagulation bath also can be used for coagulating a film or another shaped article formed from the mesophase dope of the present invention. The temperature of the coagulation bath is preferably in a range of from 0° to 15° C. The coagulation bath usually consists of at least one member selected from methyl alcohol, water, acetone, ether and mixtures thereof with an inorganic acid and/or inorganic salt. The composition of the coagulation bath is determined in response to the type of the cellulose derivative and the type of the inorganic acid in the aqueous solution. The above-mentioned coagulation bath is effective for extracting the inorganic acid from the mesophase dope. In order to completely remove the inorganic acid from the shaped article, it is effective to immerse the shaped article in the coagulation bath for a long period of time, for example, one day and night.

The specific examples presented below will serve to more fully elaborate how the present invention is practiced. However, it should be understood that the examples are only illustrative and in no way limit the scope of the present invention.

EXAMPLE 1

A dope was prepared by dissolving 30 parts by weight of methylcellulose (MC) having a degree of polymerization (DP) of 220 and a degree of substitution (DS) of 1.8 in 70 parts by weight of a 83% phosphoric acid aqueous solution at a temperature of 15° C. The resultant dope exhibited a mesophase property. The dope was degased, and then, extruded into a coagulation bath through a single spinning hole having a diameter of 0.12 mm. The spinning hole was located 0.5 cm above the level surface of the coagulation bath. The extruded monofilamentary stream of the dope was introduced into the coagulation bath which consisted of acetone containing 5% by weight of an 85% phosphoric acid aqueous solution. The coagulated MC monofilament was removed from the coagulating bath and wound up on a bobbin at a winding speed of 20 m/min. The filament had a denier of 25. The filament on the bobbin was immersed in a mixture of 1 part by weight of ether and 3 parts by weight of methyl alcohol for one hour, washed with methyl alcohol and, finally, air dried.

Figure 3:
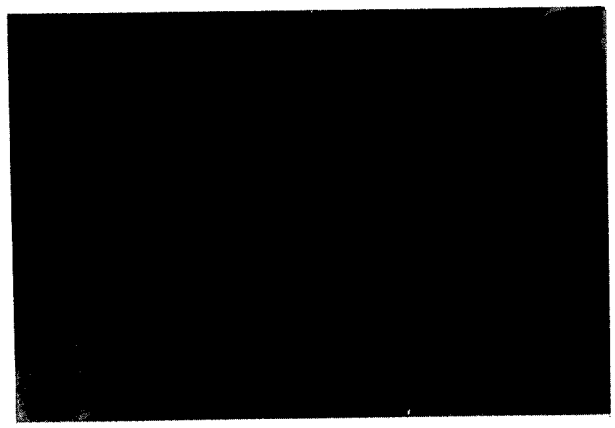
FIG. 3 is a polarized microscopic photograph showing a side view of a filament produced from a mesophase dope containing methylcellulose (MC) and phosphoric acid, as described in Example 1, in a magnification of 520.

The resultant MC monofilament was subjected to polarized microscopic observation. FIG. 3 shows a polarized microscopic side view of a peripheral surface of the MC monofilament. In FIG. 3, a number of grooves and protuberances are formed on the peripheral surface of the filament. The grooves and protuberances extend at about a right angle to the longitudinal axis of the filament. This type of grooves and protuberances are never found on conventional methylcellulose filaments. The MC monofilament had the following properties.

| Tensile strength | 3.5 g/d |
|---|---|
| Ultimate elongation | 5 ~ 6% |
| Initial modulus | 50 ~ 80 g/d |

The same procedures as those described above were applied to each of the combinations of: 55% by weight of a MC having a DP of 95 and a DS of 1.8 with 45% by weight of a 35% hydrochloric acid aqueous solution; 25% by weight of a MC having a DP of 340 and a DS of 1.8 with 75% by weight of a 65% nitric acid aqueous solution; 35% by weight of a MC having a DP of 580 and a DS of 1.8 with 65% by weight of a 72% sulfuric acid aqueous solution; 30% by weight of a MC having a DP of 750 and a DS of 1.8 with 70% by weight of a 60% perchloric acid aqueous solution; 25% by weight of a MC having a DP of 220 and a DS of 1.8 with 75% by weight of a 83% phosphoric acid aqueous solution, and; 15% by weight of a MC having a DP of 750 and a DS of 1.8 with 85% by weight of a 83% phosphoric acid aqueous solution.

All of the resultant dopes exhibited a mesophase property and could be converted into monofilaments similar to the above-mentioned monofilament, without difficulty.

EXAMPLE 2 AND COMPARATIVE EXAMPLE 1

In Example 2, a mesophase dope which is useful for producing a filament having an excellent mechanical strength and a high degree of orientation, was produced by using a cyanoethylcellulose (DS=2.89, DP=390) and an inorganic acid aqueous solution, and then, the dope was converted into a multifilament yarn. In Comparative Example 1, an organic solvent was used in instead of the inorganic acid aqueous solution, in order to compare the effect of the latter with the effect of the former.

In Example 2, a mixture of 300 g of a 73.5% nitric acid aqueous solution and 200 g of the above-mentioned cyanoethylcellulose was stirred in a one liter dissolving vessel, at room temperature, for four hour. A uniform mesophase dope containing no gel was easily obtained. The mesophase dope was allowed to stand at a temperature of 0° C., for one day, and then, degased under a reduced pressure. The degased dope was extruded into a coagulation bath through a spinneret having 50 holes, each having a diameter of 0.07 mm and located 0.5 cm above the level surface of the coagulation bath, at a extruding rate of 2.5 cc/min. The coagulation bath consisted of a 20% nitric acid aqueous solution and had a temperature of −5° C. The coagulated cyanoethylcellulose filaments were wound up on a bobbin at a speed of 60 m/min. The filaments on the bobbin were immersed in water for one day to remove the nitric acid and, finally, air dried. The properties of the dried filaments are indicated in Table 2.

In Japanese Patent Application Laid-open No. 52-96230-(1977), dimethylformamide (DMF) are used as a solvent for cyanoethylcellulose to provide a mesophase dope. Accordingly, in Comparative Example 1, 35% by weight of the same cyanoethylcellulose as that mentioned in Example 2 were mixed with 65% by weight of dimethylformamide at a temperature of 25° C., and the mixture was stirred. A slurry was obtained. In order to convert the slurry into a mesophase dope, it was necessary to continue the stirring procedure for a long period of 15 to 18 hours. The resultant dope was in the state of a gel and exhibited a very poor fiber-forming property. Therefore, it was impossible to conduct a spinning procedure by using the dope.

Separately, a dope of 25% by weight of the cyanoethylcellulose 75% by weight of dimethylformamide was prepared. The dope exhibited no mesophase property. The dope was extruded in the same manner as that mentioned in Example 2 into a coagulating bath consisting of 20% by weight of methyl alcohol and 80% by weight of water. The resultant filaments on a bobbin were immersed in a mixture of 10% by weight of methyl alcohol and 90% by weight of water, at a room temperature, for one day, and then, air dried. The properties of the resultant comparative filaments are indicated in Table 2.

TABLE 2

| Example No. | Denier | Tensile strength (g/d) | Ultimate elongation (%) | Initial modulus (g/d) | Whiteness |
|---|---|---|---|---|---|
| Example 2 | 103 | 5.6 | 4.0 | 137 | 86 |
| Comparative Example 1 | 81 | 2.9 | 8.6 | 42.3 | 65 |

The whiteness of the filaments was represented by the reflectivity of the filaments when a light having a wave length of 400 μm was applied to the filaments by using a colorimeter. The larger the amount of the solvent retained in the filaments, the lower the whiteness of the filaments.

From Table 2, it is clear that the filaments of Example 2 exhibited a higher whiteness, that is, a higher degree of purity, than that of Comparative Example 1. Also, the filaments of Example 1 had a higher tensile strength and initial modulus than those of Comparative Example 1.

Furthermore, it is clear that it is very difficult to obtain, by using an organic solvent, a mesophase dope of a cellulose derivative, which is usable for producing a shaped article, for example, filaments, because of the formation of undesirable gel in the dope.

EXAMPLE 3

In this example, 16 types of dopes were prepared at a temperature of 0° C. from various types of non-fractioned cellulose acetates having a degree of polymerization of from 250 to 300 and various types of inorganic acid, in the same manner as that described in Example 1. The compositions of the dopes are indicated in Table 3.

TABLE 3

| No. of dope | Inorganic acid solution | | Cellulose acetate | |
|---|---|---|---|---|
| | Type | Concentration (wt %) | DS | Concentration (wt %) |
| (1) | | 65 | 2.57 | 35 |
| (2) | Nitric | 30 | 1.98 | 40 |
| (3) | acid | 30 | 1.22 | 45 |
| (4) | | 5 | 0.35 | 44 |
| (5) | | 96 | 2.57 | 30 |
| (6) | Sulfuric | 60 | 1.98 | 40 |
| (7) | acid | 20 | 1.22 | 50 |

TABLE 3-continued

| No. of dope | Inorganic acid solution | | Cellulose acetate | |
|---|---|---|---|---|
| | Type | Concentration (wt %) | DS | Concentration (wt %) |
| (8) | | 20 | 0.35 | 40 |
| (9) | | 83 | 2.57 | 30 |
| (10) | Phosphoric acid | 83 | 1.98 | 35 |
| (11) | | 30 | 1.22 | 40 |
| (12) | | 30 | 0.35 | 45 |
| (13) | | 60 | 2.57 | 40 |
| (14) | Perchloric acid | 60 | 1.98 | 35 |
| (15) | | 60 | 1.22 | 40 |
| (16) | | 60 | 0.35 | 45 |

All of the resultant dopes exhibited mesophase properties and could be converted to monofilaments similar to that described in Example 1, in the same manner as that mentioned in Example 1.

EXAMPLE 4

In this example, ten types of dope, each having a composition as indicated in Table 4, were prepared. The cellulose diacetate used had a DS of 2.56 and a DP as indicated in Table 4.

TABLE 4

| No. of dope | Inorganic acid solution | Cellulose diacetate | |
|---|---|---|---|
| | | DP | Concentration (wt %) |
| 17 | 65% nitric acid | about 600 | 10 |
| 18 | | about 250 | 30 |
| 19 | 60% perchloric acid | about 450 | 18 |
| 20 | | about 100 | 32 |
| 21 | 83% phosphoric acid | about 300 | 25 |
| 22 | | about 100 | 34 |
| 23 | 60% sulfuric acid | about 600 | 18 |
| 24 | | about 450 | 25 |
| 25 | | about 300 | 30 |
| 26 | | about 250 | 30 |

All of the prepared dopes exhibited mesophase properties and could be converted into monofilaments similar to that described in Example 1, in the same manner as that described in Example 1.

EXAMPLE 5

In this example, eight types of dopes, each having a composition as indicated in Table 5, were prepared in the same manner as that described in Example 1. The cyanoethylenecellulose (CyEC) used had a DS of 0.3 and a DP of 620, and the carboxyethylcellulose (CEC) used had a DS of 0.8 and a DP of 550.

TABLE 5

| No. of dope | Inorganic acid solution | Cellulose derivative | |
|---|---|---|---|
| | | Type | Concentration (wt %) |
| 27 | 85% phosphoric acid | CyEC | 20 |
| 28 | 85% phosphoric acid | CEC | 20 |
| 29 | 60% nitric acid | CyEC | 25 |
| 30 | | CEC | 20 |
| 31 | 65% sulfuric acid | CyEC | 30 |
| 32 | | CEC | 30 |
| 33 | 30% hydrochloric acid | CyEC | 40 |
| 34 | | CEC | 50 |

Figure 4:
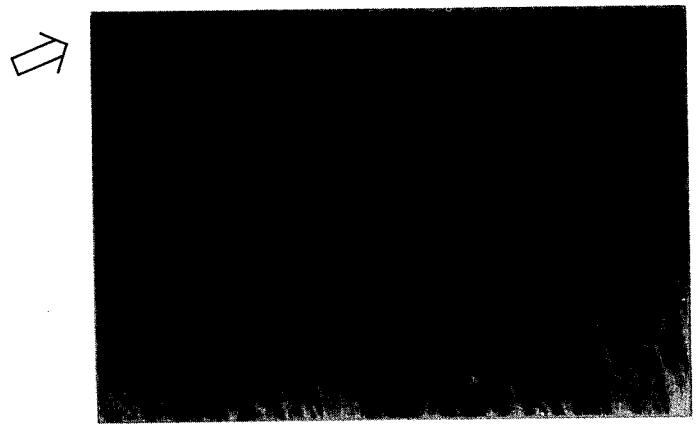
FIG. 4 is a polarized microscopic photograph showing a side view of a film produced from a mesophase dope containing carboxyethylcellulose (CEC) and nitric acid, as described in Example 4, in a magnification of 300. The arrow placed at the left of the photograph indicates the direction of a spreading procedure applied to the mesophase dope for forming the film.

All of the resultant dopes exhibited a mesophase property. The mesophase dope No. 30 was spread on an upper surface of a horizontal glass plate to form a film of the dope. The dope film spread on the glass plate was immersed in a coagulation bath consisting of methyl alcohol at a temperature of 10° C. The coagulated CEC film was washed with ethyl alcohol and, finally, air dried. A transparent thin film having a thickness of 24 microns was obtained. The film was subjected to polarized microscopic observation. The photograph of the surface view of the film is indicated in FIG. 4. In view of FIG. 4 the film is characterized by a stripe pattern formed on the surface thereof, the stripes extend at about a right angle to the direction in which the dope was spread on the glass plate.

EXAMPLE 6 AND COMPARATIVE EXAMPLES 2 AND 3

In Example 6, a mesophase dope was prepared from a combination of a water-soluble cellulose monoacetate having a degree of substitution of 0.35 and a 60% perchloric acid aqueous solution, and a new structure of filaments was prepared from the mesophase dope.

40% by weight of the above-mentioned cellulose monoacetate were dissolved in 60% by weight of the 60% perchloric acid aqueous solution. A uniform mesophase dope was obtained.

The dope was subjected to the same spinning process as described in Example 1, except that the coagulating bath consisted of methyl alcohol. The coagulated filaments were satisfactorily washed with a mixture of 40 parts by weight of methyl alcohol and 60 parts by weight of ethyl ether, and finally, air dried. The resultant cellulose monoacetate filaments each had a number of grooves formed on the peripheral surface thereof similar to those formed on the methylcellulose filaments of Example 1.

The filaments had the following properties.

| Tensile strength | 4.1 g/d |
|---|---|
| Ultimate elongation | 4% |
| Initial modulus | 92 g/d |

In Comparative Example 2, the same procedures as those described in Example 6 were carried out, except that water was used in place of the 60% perchloric acid aqueous solution. The resultant filaments had no grooves formed on the peripheral surfaces thereof. The properties of the comparative filaments were as follows.

| Tensile strength | 1.3 g/d |
|---|---|
| Ultimate elongation | 6% |
| Initial modulus | 17 g/d |

In Comparative Example 3, the same procedures as those mentioned in Example 6 were carried out, except that the 60% perchloric acid aqueous solution was replaced by an organic solvent consisting of trifluoroacetic acid alone. The resultant dope exhibited no mesophase property. When the concentration of the cellulose monoacetate was increased to 60% by weight or more, the resultant dope could exhibit the mesophase property only after stirring the dope over a long period of 15 to 20 hours. However, the resultant dope contained a large amount of cellulose monoacetate not dissolved in the organic solvent. Therefore, the dope could not be used for the spinning process.

EXAMPLE 7

In this example, six different types of dopes, each having a composition as indicated in Table 6, were prepared by using a methylcellulose having a DS of 1.8 and a DP of 140, in the same manner as that described in Example 1.

TABLE 6

| No. of dope | 35 | 36 | 37 | 38 | 39 | 40 |
|---|---|---|---|---|---|---|
| Type of inorganic acid | Hydrochloric acid | Sulfuric acid | Nitric acid | Phosphoric acid | Pyrophosphoric acid | Perchloric acid |
| Concentration of inorganic acid (% by weight) | 25 | 35 | 10 | 35 | 40 | 20 |
| Concentration of MC (% by weight) | 50 | 50 | 50 | 40 | 40 | 55 |

All of the above-prepared dopes exhibited a mesophase property and could be converted into methylcellulose filaments similar to those described in Example 1.

EXAMPLE 8

In this example, four different types of dopes, each having a composition as indicated in Table 7, were prepared. The resultant dopes exhibited a mesophase property and had a viscosity as indicated in Table 7, at a temperature of 25° C.

Each of the resultant dopes were subjected to a heat treatment with hot water, at a temperature of 60° C., for 10, 30 or 60 minutes, and thereafter, cooled to a temperature of 25° C. The heat-treated dopes had a viscosity as indicated in Table 7. The cooled dopes, which had been heat-treated for 30 minutes or less, exhibited the mesophase property, and could be converted into films in the same manner as that described in Example 5. However, the cooled dopes which had been heat treated at 60° C. for 60 minutes, exhibited no mesophase property.

When the non-heat treated dope No. 41 could be degased under a reduced pressure of 20 mmHg, at a temperature of 0° C., along time of 12 to 16 hours was needed to complete the degassing procedure. However, the degassing procedure for the dope No. 41, which had been heat treated at 60° C. for 30 minutes, could be completed within a short time of 4 to 6 hours, under the same conditions as those mentioned above.

lose acetate having a DP of 250 and a DS of 2.57, in a one liter reaction vessel at a room temperature. The dope was aged at a temperature of 50° C. for 30 minutes and, thereafter, allowed to stand at a temperature of 0° C. for one day. A mesophase dope was obtained.

The dope was degased and, thereafter, extruded through a spinneret having 50 spinning holes, having a diameter of 0.08 mm, into a coagulation bath. The spinning holes were located 0.5 cm above the level surface of the coagulating bath which consisted of an aqueous solution of 15% by weight of nitric acid and 20% by weight of sodium nitrate and had a temperature of from 0° to 4° C. The coagulated filaments were wound up from the coagulating bath onto a bobbin at a winding speed of 60 m/min. The filaments on the bobbin were washed with water to remove the nitric acid and the coagulating liquid and, then, air dried. The resultant filaments had the following properties.

| | |
|---|---|
| Denier | 142/50 filaments |
| Tensile strength | 4.4 g/d |
| Ultimate elongation | 8.5% |
| Initial modulus | 73 g/d |

The filaments were insoluble in acetone and mixtures of methylene chloride and methyl alcohol which were capable of dissolving the cellulose diacetate used in this example as a starting material.

EXAMPLE 10

In this example, various types of mesophase dopes,

TABLE 7

| | Cellulose derivative | | | Viscosity of dope (poise) | | | |
|---|---|---|---|---|---|---|---|
| No. of dope | Type | concentration (wt %) | Inorganic acid solution | Non-heat-treated | Heat treated at 60° C. | | |
| | | | | | 10 min | 30 min | 60 min |
| 41 | CyEC | 25 | 81% phosphoric acid | 2300 | 1600 | 1100 | 900 |
| 42 | EC | 40 | mixture(*)1 | 1100 | 700 | 500 | 400 |
| 43 | MC | 40 | 60% perchloric acid | 900 | 500 | 400 | 300 |
| 44 | CEC | 30 | 63% nitric acid | 1800 | 1100 | 800 | 350 |

Note:
(*)1 Mixture of 4 parts by volume of a 35% hydrochloric acid aqueous solution and 1 part by volume of a 65% nitric acid aqueous soluture.
CyEC: DP = 350, DS = 2.6
EC  : DP = 240, DS = 1.4
MC  : DP = 180, DS = 1.8
CEC : DP = 340, DS = 0.3

EXAMPLE 9

A dope was prepared by stirring a mixture of 325 g of a 60% nitric acid aqueous solution and 175 g of a cellueach having a composition as indicated in Table 8, were prepared in the same manner as that described in Example 1.

TABLE 8

| No. of dope | Cellulose derivative | | Inorganic acid solution |
|---|---|---|---|
| | Type | Concentration (wt %) | |
| 45 | HEC(*)1 | 40 | 35% hydrochloric acid |
| 46 | (250 cps, | 40 | 72% sulfuric acid |
| 47 | M.S.(*)2 = 1.8) | 45 | 60% perchloric acid |
| 48 | EC(*)3 | 35 | 65% nitric acid |

TABLE 8-continued

| No. of dope | Cellulose derivative Type | Concentration (wt %) | Inorganic acid solution |
|---|---|---|---|
| 49 | (DS = 0.6) | 40 | Mixture(*)4 |
| 50 | | 50 | 60% perchloric acid |
| 51 | CYEC(*)5 | 45 | 30% hydrochloric acid |
| 52 | (DP = 300, | 45 | 20% hydrochloric acid |
| 53 | DS = 2.5) | 30 | 83% phosphoric acid |
| 54 | | 30 | 50% phosphoric acid |
| 55 | | 30 | 65% pyrophosphoric acid |
| 56 | CYEC-CEC(*)6 | 40 | 72% nitric acid |
| 57 | (DS = 1.5(average)) | 40 | 60% hypochlorous acid |
| 58 | | 37 | 40% sulforous acid |
| 59 | HPC(*)7 | 40 | 5% nitric acid |
| 60 | (M.S. = 2.4) | 40 | 12% hydrochloric acid |
| 61 | CMC(*)8 | 27 | 73% nitric acid |
| 62 | (DS = 0.8) | 30 | 72% sulfuric acid |

Note:
(*)1-hydroxyethylcellulose
(*)2-molecular substitution
(*)3-ethylcellulose
(*)4-mixture of 4 parts by volume of a 35% hydrochloric acid and 1 part by volume of a 65% nitric acid
(*)5-cyanoethylcellulose
(*)6-cyanoethylcellulose-carboxyethyl-cellulose copolymer
(*)7-hydroxypropylcellulose
(*)8-carboxymethylcellulose

EXAMPLE 11

In this example, five different types of mesophase dopes were prepared, each having a composition as indicated in Table 9, in the same manner as that mentioned in Example 1.

TABLE 9

| No. of dope | Inorganic acid solution | Cellulose derivative Type | Concentration (wt %) |
|---|---|---|---|
| 63 | 100% chlorosulfuric acid | CA(DS = 2.56) | 40 |
| 64 | 78% thiosulfuric acid | HEC(DS = 0.8) | 50 |
| 65 | 82% metaphosphoric acid | MC(DS = 1.8) | 45 |
| 66 | 65% thiocyanic acid | CYEC(DS = 0.8) | 40 |
| 67 | 50% bromic acid | MC(DS = 0.8) | 55 |

COMPARATIVE EXAMPLE 4

The same procedures as those mentioned in Example 2 were carried out, except that the CYEC was used in a concentration of 9.5% by weight. The resultant dope exhibited no mesophase property. Also, the resultant filaments had the following properties.

| | |
|---|---|
| Denier | 45/50 filaments |
| Tensile strength | 2.2 g/d |
| Ultimate elongation | 15% |
| Initial modulus | 24 g/d |

The degree of orientation of the molecular chains in the filaments was poor.

COMPARATIVE EXAMPLE 5

The same procedures as those described in Example 1 were carried out, except that the 83% phosphoric acid aqueous solution was replaced by water and the MC was used in a concentration of 30% by weight. The resultant dope exhibited no mesophase property. The resultant monofilament had the following properties.

| | |
|---|---|
| Tensile strength | 1.2 g/d |
| Ultimate elongation | 10% |
| Initial modulus | 15 g/d |

The filament had substantially no grooves and protuberance formed on the peripheral surface thereof.

We claim:

1. A mesophase dope comprising at least 15% by weight of at least one cellulose ether, dissolved in an aqueous solution of at least 5% by weight of at least one inorganic acid, said dope exhibiting a mesophase property even in the case where no fluid dynamic stress is applied thereto.

2. A mesophase dope as claimed in claim 1 wherein said cellulose ether is selected from the group consisting of methylcellulose, ethylcellulose, cyanoethylcellulose, carboxyethylcellulose, carbamoylethylcellulose, cyanoethylcarbamoylethylcellulose, cyanoethylcarboxyethylcellulose, hydroxyethylcellulose, ethylhydroxyethylcellulose, hydroxypropylcellulose, hydroxypropylmethylcellulose, carboxymethylcellulose, acetoxymethylcellulose, acetoxymethylcellulose acetate and possible salts of the above-mentioned cellulose ether compounds.

3. A mesophase dope as claimed in claim 1, wherein said cellulose ether is selected from the group consisting of methylcellulose, ethylcellulose, cyanoethylcellulose, carboxyethylcellulose, hydroxyethylcellulose, cyanoethylcarboxyethylcellulose, and sodium salt of carboxymethylcellulose.

4. A mesophase dope as claimed in claim 1, wherein said cellulose ether is selected from the group consisting of methylcellulose and ethylcellulose, each having a degree of substitution (DS) of 2.3 or less.

5. A mesophase dope as claimed in claim 1, wherein said cellulose ether is acetoxymethylcellulose having a degree of substitution (DS) satisfying the relation:

$$0 < DS < 2.7.$$

6. A mesophase dope as claimed in claim 1, wherein said cellulose ether is selected from the group consisting of cyanoethylcellulose, carboxyethylcellulose, hydroxypropylcellulose, hydroxyethylcellulose each having a degree of substitution (DS) satisfying the relation:

$0 < DS \leq 3.0$.

7. A mesophase dope as claimed in claim 1, wherein said inorganic acid is selected from the group consisting of hydrochloric acid, nitric acid, sulfuric acid, phosphoric acid, metaphosphoric acid, pyrophosphoric acid, hypophosphoric acid, sulfurous acid, fluorosulfuric acid, chlorosulfuric acid, chloric acid, hypochlorous acid, chlorous acid, perchloric acid, bromic acid, perbromic acid, hypobromous acid, hydrofluoric acid, thiocyanic acid and thiosulfuric acid.

8. A mesophase dope as claimed in claim 1, wherein said inorganic acid is selected from the group consisting of hydrochloric acid, nitric acid, sulfuric acid, phosphoric acid, perchloric acid, pyrophosphoric acid, chlorosulfuric acid, thiosulfuric acid, metaphosphoric acid, thiocyanic acid and bromic acid.

9. A mesophase dope as claimed in claim 1, wherein an aqueous solution of nitric acid contains cyanoethylcellulose.

10. A mesophase dope as claimed in claim 1, wherein an aqueous solution of nitric acid or sulfuric acid contains methylcellulose.

* * * * *